United States Patent [19]

Khutoretsky et al.

[11] 4,383,190

[45] May 10, 1983

[54] NON-REVERSIBLE ELECTRICAL MACHINE WITH GAS COOLING

[76] Inventors: Garri M. Khutoretsky, ulitsa Altaiskaya, 20, kv. 5; Anatoly D. Ignatiev, ulitsa Basseinaya, 35, kv. 162; Elrikh I. Gurevich, ulitsa Kuznetsovskaya, 44, kv. 222; Sergei Y. Shurygin, Malodetskoselsky prospekt, 33, kv. 24; Tamara N. Belova, ulitsa Budapeshtskaya, 3, korpus 2, kv. 138, all of Leningrad, U.S.S.R.; Evgeny M. Azarov, deceased, late of Leningrad, U.S.S.R.; by Ekaterina A. Azarov, administrator, ulitsa Kupchinskaya, 30, korpus 1, kv. 336, Leningrad, U.S.S.R.

[21] Appl. No.: 261,171

[22] PCT Filed: Aug. 30, 1979

[86] PCT No.: PCT/SU79/00080

§ 371 Date: Apr. 29, 1981

§ 102(e) Date: Apr. 29, 1981

[87] PCT Pub. No.: WO81/00649

PCT Pub. Date: Mar. 5, 1981

[51] Int. Cl.$^3$ .............................................. H02K 9/00
[52] U.S. Cl. ..................................... 310/55; 310/58; 310/64
[58] Field of Search ................. 310/52, 53, 55, 58, 310/59, 62, 63, 64, 65, 60 R, 260

[56] References Cited

U.S. PATENT DOCUMENTS

| | | | |
|---|---|---|---|
| 2,707,243 | 4/1955 | Baudry et al. | 310/64 |
| 2,742,582 | 4/1956 | Bahn et al. | 310/55 |
| 3,110,827 | 11/1963 | Baudry | 310/55 |
| 3,254,246 | 5/1966 | Philofsky et al. | 310/55 |
| 3,413,499 | 11/1968 | Barton | 310/55 |
| 3,739,208 | 6/1973 | Shartrand | 310/64 |
| 4,051,400 | 9/1977 | Armor et al. | 310/58 |
| 4,163,163 | 7/1979 | Gurevich et al. | 310/64 |

FOREIGN PATENT DOCUMENTS 520670  9/1976  U.S.S.R. .......................... 310/58

Primary Examiner—R. Skudy
Attorney, Agent, or Firm—Fleit, Jacobson & Cohn

[57] ABSTRACT

A non-reversible electrical machine with gas cooling comprises a body (6) with built-in gas coolers (7), said body (6) accommodating a stator winding with end connections (5), a rotor (1) whose shaft carries fans (2) having exhaust chambers (8) and pressure chambers (9), and a stator core (3) with radial vent ducts (4) being divided, together with a space between it and the body (6), into segments (11) which are associated with the exhaust chambers (8) of the fans (2), and also into the same number of alternating segments (12) which are associated with the pressure chambers (9) of the fans (2). The radial vent ducts (4) in each area of the stator core (3), adjoining to the end connections (5) of the stator winding are separated from the remaining radial vent ducts (4) by two cylindrical partitions (14 and 18). One partition (18) is positioned in a gap (16) between the rotor (1) and the stator core (3) and forms together with the inner surface of the stator core (3) an annular cavity (19) which is associated with a respective exhaust chamber (8) of the fan (2). The other partition (14) is positioned in a space between the stator core (3) and the body (6) and forms together with the external surface of the stator core (3) an annular cavity (15) communicating with the segments (12) which are associated with the pressure chambers (9) of the fans (2). Both cavities (15 and 19) are associated with each other through the radial vent ducts (4) in the area adjoining the end connections (5) of the stator winding.

2 Claims, 2 Drawing Figures

NON-REVERSIBLE ELECTRICAL MACHINE WITH GAS COOLING

FIELD OF THE INVENTION

The invention relates to electrical machines, and more particularly to non-reversible electrical machines with gas cooling.

PRIOR ART

Known in the art is a gas-cooled electrical machine (USSR Inventor's Certificate No. 520,670, published in D Inventions, Industrial Designs and Trade Marks Bulletin No. 25, 1976) comprising fans on the rotor shaft, radial spacing members between the stator core stacks, and longitudinal partitions between the body and the core of the stator, adapted to define segmental inlets and outlets for a coolant. The pressure chambers of the fans are associated with the segmental inlets via the area of the end connections of the stator winding. The longitudinal partitions are mounted in the planes accommodating the radial spacing members, are joined therewith and directly with the body, thus forming the same number of segmental inlets and outlets.

In the described machine, those areas of the stator core which are juxtaposed to the end connections of the stator winding and produce excessive amount of heat cannot be cooled effectively.

There is another non-reversible electrical machine (British Pat. No. 1,503,404, published Apr. 6, 1976) with gas cooling, comprising a rotor whose shaft carries fans, a stator core with radial vent ducts, and a stator winding having end connections located in end faces of the machine, said elements being accommodated in a body having built-in gas coolers and pressure and exhaust chambers for the fans. The stator core, together with a space separating it from the body, is divided, in a tangentional direction, into segments which are associated with the fan exhaust chambers directly via the area of the end connections of stator winding, and also into another segments which are arranged in alternative relation to said first segments, are equal in number to the latter and are associated with the fan pressure chambers via the gas coolers.

In this machine, the gas flow through the cooling circuit is adapted to pass twice over the radial vent ducts of the stator core as follows: first, it is fed from the external surface of the stator core to a gap defined between the rotor and the stator core, and then the gas flow is led in the opposite direction.

The areas of the stator core juxtaposed to the end connections and producing greater heat as compared to the remaining portions of the stator core are cooled down effectively, but a two-fold movement of the gas flow via the radial vent ducts results in accumulation of heat content. As a result, the temperature of said areas of the stator core in the segments associated with the exhaust chambers of the fans and cooled by the gas differs considerably from the temperature of the main portion of the core.

DISCLOSURE OF THE INVENTION

An object of the invention is to provide, in a non-reversible electrical machine with gas cooling, for more effective cooling of those areas of the stator core which are juxtaposed to the end connections of the stator winding.

There is provided a non-reversible electrical machine with gas cooling, comprising a body with built-in gas coolers, said body accommodating a stator core with radial vent ducts, a stator winding having end connections arranged in end face areas of the body, and a rotor whose shaft carries fans, the latter being provided with pressure and exhaust chambers, the stator core, together with a space separating it from the body, being divided in a tangential direction into segments which are associated with the fan exhaust chambers directly through the area of the end connections of the stator winding, and also into another segments which are arranged in alternate relation to said first segments, are equal in number to the latter and are associated with the fan pressure chambers, according to the invention, the radial vent ducts in each area of the stator core juxtaposed to the end connections of the stator winding are separated from the remaining radial vent ducts by two cylindrical partitions, one of said partitions being positioned within a gap between the rotor and the stator core and adapted to form, together with the inner surface of the stator core and the end connections of the stator winding, an annular cavity which is associated with a respective fan exhaust chamber, the other cylindrical partition being positioned within a space between the stator core and the body and adapted to form, together with the external surface of the stator core, another annular cavity which is associated with the segments communicating with the fan pressure chambers, the both annular cavities being associated with each other via the radial vent ducts located in that area of the stator core which is juxtaposed to the end connections of the stator winding.

Preferably, each cylindrical partition located within the gap between the stator core and the rotor should extend beyond the active length of the rotor.

With the present invention, the temperature of the areas of the stator core juxtaposed to the end connections of the stator winding is decreased, with the result that the electric insulation is subject to better operating conditions, the service life and reliability of the machine is increased, maintenance costs are reduced due to an increase in the interrepair time, the control limits are extended, and the range of possible operating modes is increased.

BRIEF DESCRIPTION OF DRAWINGS

The invention will now be described in more detail, by way of example, with reference to the accompanying drawings in which.

BEST MODE OF REALIZING THE INVENTION

Figure 1:
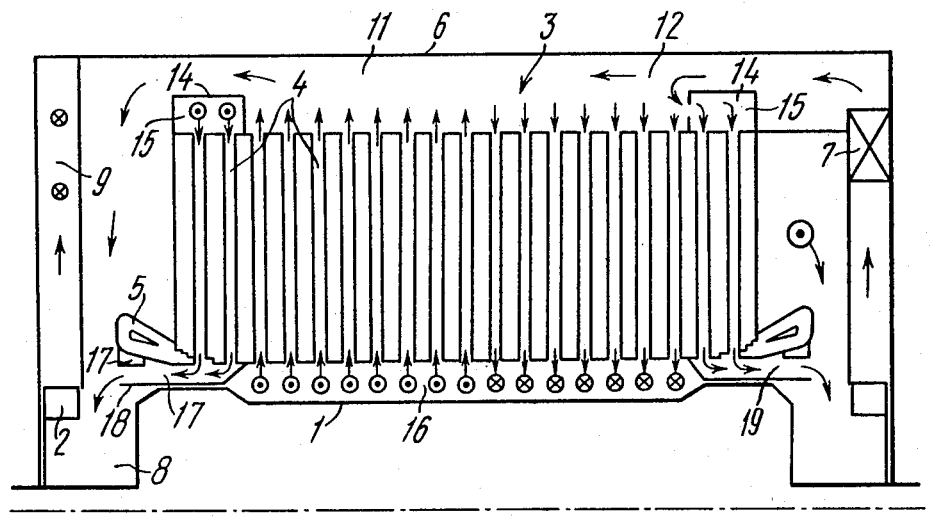
FIG. 1 is a diagrammatical representation of a complex longitudinal section of a non-reversible electrical machine with gas cooling, the left portion of the section being located in a plane passing through the center of the segment communicating with the fan exhaust chamber, and the right portion of the section being located in a plane passing through the center of the segment communicating with the fan pressure chamber, according to the invention.
Figure 2:
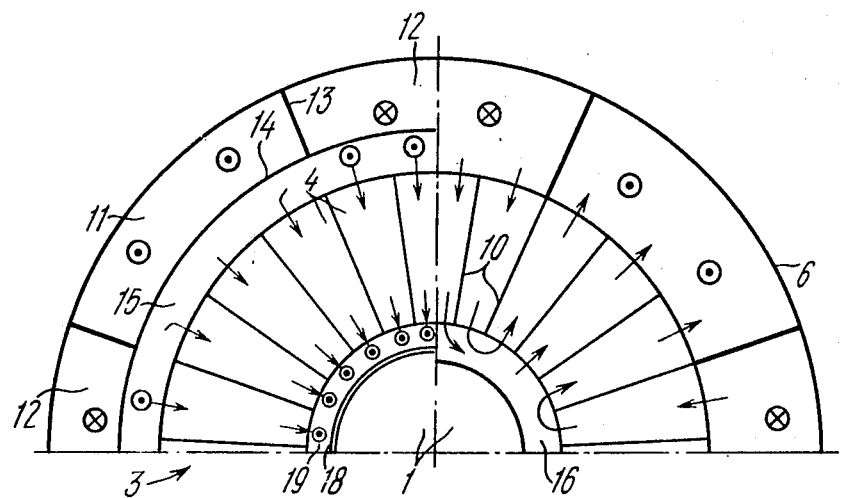
FIG. 2 is a diagrammatical representation of a complex lateral section of a non-reversible electrical machine with gas cooling, the left portion of the section being located in a plane passing through that area of the stator core which is juxtaposed to the end connections of the stator winding, and the right portion of the section being located in a plane passing through the main portion of the stator core, according to the invention.

The non-reversible electrical machine with gas cooling comprises a rotor 1 (FIG. 1) whose shaft carries fans 2, a stator core 3 with radial vent ducts 4, and a stator winding (not shown) having end connections 5 in the end face areas of the machine, said elements being accommodated in a body 6 having built-in gas coolers 7 and exhaust 8, and pressure 9, chambers of the fans 2. The stator core 3 (FIG. 2) having the radial vent ducts 4 formed by radial spacing members 10 is divided in a tangential direction, together with a space between the body 6 and the stator core 3, by means of the radial spacing members 10 and longitudinal partitions 13, into segments 11 which are associated with the exhaust chambers 8 (FIG. 1), and also into segments 12 (FIG. 2) which are communicated with the pressure chambers 9 (FIG. 1). The segments 11 are equal in number to the segments 12. The segments 11 communicate with the exhaust chambers 8 directly via the area of the end connections 5, whereas the segments 12 are associated with the pressure chambers 9 via the gas coolers 7. The radial vent ducts 4 in each area of the stator core 3 juxtaposed to the end connections 5 are separated from the remaining radial vent ducts 4 by a cylindrical partition 14 which is located in a space between the body 6 and the stator core 3. The partition 14 forms, together with the external surface of the stator core 3, a cavity 15 which is associated with the segments 12 only. A cylindrical partition 18 is used to separate the radial vent ducts 4 in each area of the stator core 3 juxtaposed to the end connections 5 from the remaining radial vent ducts 4. The partition 18 is located within a gap between the rotor 1 and the stator core 3 and attachment elements 17 of the end connections 5. The partition 18 forms, together with the inner surface of the stator core 3 and the end connections 5, an inner annular cavity 19. The cavities 15, 19 are associated with each other via the radial vent ducts 4 located in the area juxtaposed to the end connections 5. The cylindrical partition 18 extends beyond the active length of the rotor 1, with the result that the rotating surfaces do not act on the flow of gaseous coolant.

The arrows in the drawings show the flow of gaseous coolant during the operation of the non-reversible electrical machine of the invention. The arrow with a dot shows how the gaseous coolant moves upwards at right angles to the drawing plane, whereas the arrow with a cross shows how the gaseous coolant moves in the drawing plane.

The machine of the invention operates in the following manner. The gaseous coolant forced by the fans 2 (FIG. 1) passes through the gas coolers 7 into the segments 12 (FIG. 2) of the stator core 3 and into the cavities 15 and is then led into the radial vent ducts 4 belonging to the segments 12 and cavities 15. When passing through the radial vent ducts, the gaseous coolant is given heat produced by the stator core 3. Part of the coolant passing through the radial vent ducts 4 separated by the cylindrical partitions 14, 18 passes from the cavities 15 into the cavities 19 and is then led into the exhaust chambers 8 (FIG. 1). At the same time, the main part of the coolant is fed through the radial vent ducts 4, not included into the area juxtaposed to the end connections 5, into the gap 16, is moved tangentially therein and is heated up due to friction resulted from the rotation of the rotor 1. Within the area including the segments 11 (FIG. 2) associated with the exhaust chambers 8 (FIG. 1), the coolant is fed into the radial vent ducts 4 belonging to these segments 11, is given heat from the stator core 3 and enters the exhaust chambers 8 where it is mixed with the flow of gas from the cavities 19, and the cooling cycle is then repeated again.

Therefore, there exist three circulation circuits for the gaseous coolant as follows. In the first circuit belonging to the main portion of the stator core 3, the same flow of the gaseous coolant passes twice through the radial vent ducts 4 and through the gap 16 in a tangential direction. Note that the portions of the stator core 3 positioned in the segments 11, associated with the exhaust chambers 8, are cooled by the gas which has been heated up by heat available from the segments 12 which are associated with the pressure chambers 9. The second and third circulation circuits for the gaseous coolant are formed within the areas of the stator core 3 juxtaposed to the end connections 5, in which case the coolant passes a single time through the radial vent ducts 4 and is fed to the exhaust chambers 8. In these circuits, the areas of the stator core 3 juxtaposed to the end connections 5 are cooled over the entire circumference of the stator core 3 by the gas having the same temperature. Moreover, a small size of the circuits and the availability of the cylindrical partition 18, which extends beyond the active length of the rotor 1, result in a decrease in the aerodynamic resistance of the circuits as compared to the main portion of the stator core 3, with the result that the gas flow rate for the circuits is increased and better cooling is provided for the areas of the stator core 3 juxtaposed to the end connections 5.

INDUSTRIAL APPLICABILITY

This invention can be used in large electrical machines featuring a closed ventilation system, e.g. in turbogenerators.

It is claimed:

1. A non-reversible electrical machine with gas cooling, comprising a body with built-in gas coolers, said body accommodating a stator winding with end connections in end face areas of the body, a rotor whose shaft carries fans provided with exhaust and pressure chambers, and a stator core with radial vent ducts divided, together with a space between it and the body, in a tangential direction into segments associated with the fan exhaust chambers directly via the area of the end connections of the stator winding, and also into other segments which are arranged in alternate relation to said first segments, are equal in number to the latter and are associated with the fan pressure chambers via the gas coolers, characterized in that the radial vent ducts (4) in each area of the stator core (3) juxtaposed to the stator winding end connections (5) being separated from the remaining radial vent ducts (4) by two cylindrical partitions (14, 18), one of said partitions (18) connected to the inner portion of the stator core (3) and being positioned within a gap (16) between the rotor (1) and the stator core (3) and adapted to form, together with the inner surface of the stator core (3) and the end connections (5) of the stator winding, an inner annular cavity (19) which communicates with a fan exhaust chamber (8), the other cylindrical partition (14) being positioned within a space between the stator core (3) and the body (6) and adapted to form, together with the external surface of the stator core (3), an outer annular cavity (15) which communicates with the segments (12), which in turn, communicate with the fan pressure chambers (9), the both annular cavities (15, 19) communicating with each other via the radial vent ducts (4) located in the end area of the stator core (3) which is juxtaposed to the end connections (5) of the stator winding.

2. A non-reversible electrical machine with gas cooling as claimed in claim 1, wherein each cylindrical partition (18) located within the gap (16) between the stator core (1) and the rotor (3) extends beyond the active length of the rotor (1).

* * * * *